United States Patent

[11] 3,622,467

[72] Inventors Alden E. Blood;
Max Statman; Glenn L. Phillips, all of Longview, Tex.
[21] Appl. No. 675,348
[22] Filed Oct. 16, 1967
[45] Patented Nov. 23, 1971
[73] Assignee Eastman Kodak Company
Rochester, N.Y.

[54] PROCESS FOR THE RECOVERY AND PURIFICATION OF ALKYL METHACRYLATE
9 Claims, No Drawings
[52] U.S. Cl.................................................. 203/75,
203/82, 260/486 D, 260/540
[51] Int. Cl.................................................. B01d 3/10
[50] Field of Search.......................................... 260/486;
203/75, 82

[56] References Cited
UNITED STATES PATENTS
2,336,493   12/1943   Marks .......................... 260/486 X
3,157,693   11/1964   Wheeler....................... 260/486

Primary Examiner—Lorraine A. Weinberger
Assistant Examiner—Paul J. Killos
Attorneys—William T. French and Donald W. Spurrell ABSTRACT: A process for recovering alkyl methacrylates from reactor effluent obtained from the hydrogen iodide hydrate catalyzed oxidative dehydrogenation of alkyl isobutyrates, wherein the reactor effluent contains isobutyric acid in an amount of at least 20 weight percent based on the alkyl methacrylate. The isobutyric acid serves as a polymerization inhibitor which allows distillation of the alkyl methacrylate at atmospheric pressure. Also, the low-boiling coproducts can be recycled to the reactor with unreacted alkyl isobutyrate without producing additional undesirable side products.

PROCESS FOR THE RECOVERY AND PURIFICATION OF ALKYL METHACRYLATE

This invention pertains to a process for recovering an alkyl methacrylate from reactor effluent obtained from the hydrogen iodide hydrate catalyzed oxidative dehydrogenation of the corresponding alkyl isobutyrate.

In processes for preparing alkyl methacrylates, in particular methyl methacrylate, it has heretofore been necessary to purify the product by distillation employing a polymerization inhibitor for the methyl methacrylate such as hydroquinone or methoxyphenol, and usually under a vacuum to reduce the distillation temperature and thereby impede polymerization. It is an object therefore of this invention to provide an improved process for the recovery and purification of alkyl methacrylates.

Another object is to provide an improved process for removing alkyl methacrylates from reactor effluent obtained from the hydrogen iodide hydrate catalyzed oxidative dehydrogenation of alkyl isobutyrates without the need for adding any inhibitors or for using reduced distillation pressures.

A further object is to provide a process for the removal and recycling of unreacted alkyl isobutyrates and low-boiling coproducts to the reactor for the hydrogen iodide hydrate catalyzed oxidative dehydrogenation of said alkyl isobutyrate.

These and other objects are attained by the process of this invention which, briefly, comprises removing and recycling, from the effluent (which contains at least 20 weight percent of isobutyric acid based on alkyl methacrylate) from a reactor for iodide hydrate catalyzed oxidative dehydrogenation of alkyl isobutyrate, the low-boiling coproducts comprising alkyl iodides, methanol, acetone, alkyl acrylate and water and alkyl isobutyrate and distilling off alkyl methacrylate from the remaining portion of the effluent comprising alkyl methacrylate and isobutyric acid. The isobutyric acid must be present in the dehydrogenation reactor effluent stream in an amount of at least about 20 and preferably 20 to about 40 weight percent based on alkyl methacrylate prior to any distillation of said effluent stream. Isobutyric acid should be added to the effluent stream from the reactor whenever the percentage of the acid in said stream falls below 20 weight percent based on alkyl methacrylate. The isobutyric acid prevents the polymerization of alkyl methacrylate during its separation and recovery by the distillation of the mixture at or above polymerization temperature of alkyl methacrylate.

Alkyl methacrylates contemplated by the process of this invention comprise those methacrylates wherein said alkyl group contains from one to eight carbon atoms and more specifically, from one to four carbon atoms. The process of this invention is particularly useful for the recovery and purification of methyl methacrylate from reactor effluent obtained from the hydrogen iodide hydrate catalyzed oxidative dehydrogenation of methyl isobutyrate.

In accordance with the invention, reactor effluent obtained from the hydrogen iodide hydrate catalyzed oxidative dehydrogenation of methyl isobutyrate and which contains at least 20 weight percent isobutyric acid based on methyl methacrylate is introduced into a distillation column. The column may, for example, contain 100 to 120 plates and is operated at about atmospheric pressure and at a temperature from about 85° to about 130° C. Methyl isobutyrate and low-boiling coproducts are removed from the top of the column and recycled to the reactor for the hydrogen iodide hydrate catalyzed oxidative dehydrogenation of methyl isobutyrate. Methyl methacrylate and isobutyric acid are removed from the bottom of the column and introduced into a distillation column which may contain about 20 plates and is operated below atmospheric pressure with a base temperature of about 110° to about 120° C. The purified methyl methacrylate is removed from the top of the column and isobutyric acid is removed from the bottom of the column. The isobutyric acid can be esterified and recycled to the reactor for the hydrogen iodide hydrate catalyzed oxidative dehydrogenation of methyl isobutyrate or added to the effluent as needed to maintain the minimum amount needed to prevent the polymerization of the methyl methacrylate.

The reactor effluent may be prepared according to any of the known oxidative dehydrogenation processes for preparing alkyl methacrylates. Generally, in such processes, the organic compound and catalyst solution are preferably vaporized by heating and passed with air, which may also be preheated, into a heated reaction zone under atmospheric pressure although the system may be maintained under low pressure if desired. For example, useful results are obtained with 10–200 p.s.i.g. reactor exit pressure, with yields and conversions often being increased by reaction under pressure, in part depending upon the particular reactant in use. Thus a 15 percent conversion at zero p.s.i.g. can increase to about 25 percent at 10 p.s.i.g. The reaction zone is heated to about 500°–700° C. The gas flow through the system may be at a space velocity (ml. of gaseous reactants at STP per ml. of reactor per hour) of about 300–5,000. If desired, the reactants can be added to the reactor at the same or different points in the reactor section. Following reaction, the gaseous stream may be quenched, preferably at once, with water, catalyst solution or unsaturated product.

The reactor effluent may be prepared according to the process described in copending Blood et al. application Ser. No. 388,196, filed Aug. 7, 1964, now abandoned, as follows:

Hydrogen iodide hydrate catalyst solution and organic compound, e.g., methyl isobutyrate, preheated separately to above 300° C. and air or oxygen, which may also be preheated, are passed into an oxidative dehydrogenation reactor heated to a temperature above 400° C. The materials are held in the reaction zone for only a short time, e.g., a residence time of 1 second. The effluent passes from the oxidative dehydrogenation reactor and preferably is rapidly quenched by the use of water, hydrogen iodide hydrate solution or recycled unsaturated product.

Alternatively, the reactor effluent may be prepared according to the process of copending application Ser. No. 519,635, filed Jan. 10, 1966, now U.S. Pat. No. 3,425,798. In a representative process, the organic compound, hydrogen iodide hydrate catalyst solution and air are introduced into the reactor and heated to effect oxidative dehydrogenation of the organic compound. The effluent from the reactor is preferably rapidly quenched by water, catalyst solution or recycled unsaturated product. After passing through a liquid-gas separator, the reactor effluent is passed through a column column containing a bed of aluminum turnings.

Similarly, the reactor effluent comprising alkyl methacrylate may be prepared from such oxidative dehydrogenation processes as those described in U.S. Pat. Nos. 2,719,171 and 2,921,101. Thus it will be readily apparent that the process of this invention may be used to purify the reactor effluent from any of the known oxidative dehydrogenation processes, it being only necessary that there be present in such effluent an amount of isobutyric acid of at least 20 weight percent based on alkyl methacrylate in said effluent. Preferably, it is desirable to utilize reactor effluent prepared from the hydrogen iodide hydrate catalyzed oxidative dehydrogenation processes of applications Ser. Nos. 388,196 and 519,635 and in particular the reactor effluent obtained from the latter process.

The composition of the reactor effluent will vary depending upon the process employed, the reactants and operating conditions. For example, when the reactor effluent is obtained from the preferred process of application Ser. No. 519,635 and the alkyl isobutyrate to be converted is methyl isobutyrate, the reactor effluent from the aluminum bed tower is an iodine-free mixture comprising methyl iodide, methanol, acetone, methyl acrylate, water, methyl isobutyrate, methyl methacrylate and isobutyric acid. The exact concentration of these components will vary according to process conditions such as quench temperature, quench residence time, etc. In general, however, the concentrations are: 0.5 percent methyl iodide, 15.8 percent methyl methacrylate, 4 percent isobutyric acid, 0.5 percent methyl acrylate, 2 percent water, 1.6 percent methanol, 1.6 percent acetone and 74 percent methyl isobutyrate.

The following example illustrates a method for preparing the reactor effluent.

EXAMPLE 1

A mixture of methyl isobutyrate to be dehydrogenated and an aqueous solution of hydrogen iodide hydrate containing about 20 percent hydrogen iodide is contacted with air in a ceramic-lined reactor packed with siliceous material, e.g., pieces of silicon carbide, at a temperature of about 450° to 650° C. The molar ratio of the methyl isobutyrate to oxygen is about 6.1. The product stream is quickly quenched upon leaving the reaction zone using a cooled spray of preferably recycled organic product, so as to reduce the temperature of the product stream to about 20° to 80° C. The quenched stream is then passed into a liquid-gas separator, the gas going to a scrubber for recovery of entrained organic material. The condensed effluent is passed through a heat exchanger to a decanting vessel where the aqueous catalyst solution is separated from the crude organic product stream. The crude organic product stream is fed to a column packed with aluminum turnings for removal of iodine. The iodine-free product stream is then treated in accordance with the process of this invention.

The oxidative dehydrogenation reaction effluent comprising alkyl methacrylate and isobutyric acid can be distilled at atmospheric pressure in the absence of the usual inhibitors without polymerization of the alkyl methacrylate. The concentration of isobutyric acid must be maintained at a level of at least 20 weight percent based on alkyl methacrylate in the effluent prior to any distillation thereof. Thus it may be necessary to add isobutyric acid to the effluent stream should the level drop below 20 weight percent. During the distillation, for example of reactor effluent comprising methyl methacrylate, low-boiling materials such as methyl iodide, acetone, methanol, water, methyl acrylate, methyl isobutyrate, etc., can be removed as one combined cut for recycle back to the reactor. The presence of the low-boiling coproducts methanol, acetone and methyl acrylate in the recycle methyl isobutyrate does not adversely affect the process as would be predicted nor do these low-boiling coproducts build up in concentration on recycling as would normally be expected. The methyl iodide is converted to hydrogen iodide in the reactor and is thus recovered as catalyst.

The failure of the methyl methacrylate in the base of the column to polymerize is quite surprising since the temperature of the base is 110°–120° C. Normally, methyl methacrylate in the absence of hydroquinone or some other inhibitor such as methoxyphenol will form a polymer within a few minutes when it is heated at 110°–120° C. This feature i.e., distillation of reactor effluent in the absence of added inhibitor, is important in reducing the column diameter and thus reducing costs.

The discovery that isobutyric acid will inhibit polymerization of alkyl methacrylates when present in the reactor effluent in a concentration greater than 20 weight percent based on alkyl methacrylate is particularly surprising when it is considered that isobutyric acid is a byproduct of the oxidative dehydrogenation reaction discussed herein.

Isobutyric acid is added to the crude stream prior to any distillation if it does not contain at least 20 percent based on the methyl methacrylate present.

The methyl methacrylate and isobutyric acid mixture from the base of the column is then distilled in a second column under vacuum to remove pure methyl methacrylate.

The following examples illustrate the best mode contemplated in carrying out this invention.

EXAMPLE 2

In the preparation of methyl methacrylate according to this invention a product stream from the process described in example 1 and which contained 75.80 percent methyl isobutyrate, 15.56 percent methyl methacrylate, 3.89 percent isobutyric acid, 0.50 percent methyl iodide, 0.3 percent methyl acrylate, 1.50 percent water, 1.2 percent methanol, and 1.25 percent acetone was fed to a distillation column at a rate of 357 pounds per hour. The distillation column is a 120-plate column operated at atmospheric pressure at a 7:1 reflux ratio. The top temperature was 91.4° C. The base temperature was 111.2° C. From the top of the column was removed 293.4 pounds per hour of material containing 94.1 percent methyl isobutyrate, 0.61 percent methyl iodide, 1.83 percent water, 0.40 percent methyl acrylate, 1.5 percent methanol, and 1.53 percent acetone. This stream was recycled to the reactor.

From the base of the distillation column was removed 69.3 pounds per hour of material containing 79.7 percent methyl methacrylate and 20.3 percent isobutyric acid. There was no polymer present in this material as determined by flash distillation and by dilution with methanol. The base material from the distillation column was fed to a second distillation column which is a 20-plate column operated under 150 mm. of mercury vacuum at a 2:1 reflux ratio. From the top of the second distillation column was removed 55.2 pounds per hour of pure methyl methacrylate containing 0.002 percent acid and 0.01 percent water. From the base of the column was removed essentially only isobutyric acid.

EXAMPLE 3

Example 1 was repeated except that the aluminum bed effluent was first flashed to remove most of the isobutyric acid so that the material charged to the first distillation column contained only 1.2 percent isobutyric acid. Polymer formed in the base of this column within 2 hours to such an extent that heat transfer was lost in the base heater and the column had to be shut down.

Isobutyric acid was then added back so that a concentration of 4 percent was reached. The distillation was resumed with the same results as obtained in example 1.

EXAMPLE 4

The experiment in example 2 was repeated except that 0.1 percent hydroquinone was added to the flashed feed containing only 1 percent isobutyric acid. Again, polymer formation occurred after 3 hours of operation.

The invention has been described in considerable detail with particular reference to certain preferred embodiments thereof, but it will be understood that variations and modifications can be effected within the spirit and scope of the invention as described hereinbefore and as defined in the appended claims.

We claim:
1. A process for the recovery and purification of an alkyl methacrylate wherein the alkyl group contains one to eight carbon atoms, and wherein at least a portion of impure alkyl methacrylate is produced by the catalytic dehydrogenation of alkyl isobutyrate, said process comprising:
   a. feeding a substantially catalyst-free impure alkyl methacrylate into a distillation means;
   b. providing at least 20 weight percent isobutyric acid, based on the alkyl methacrylate content, into said distillation means;
   c. operating said distillation means at a temperature above the polymerization temperature of the alkyl methacrylate so as to separate a fraction comprising alkyl methacrylate and isobutyric acid;
   d. feeding said fraction comprising alkyl methacrylate and isobutyric acid into a second distillation means; and
   e. operating said second distillation means at a temperature so as to separate a fraction comprising essentially pure alkyl methacrylate.

2. A process according to claim 1 wherein the components remaining after the removal of said fraction comprising alkyl methacrylate and isobutyric acid are recycled to the alkyl methacrylate manufacturing process.

3. A process according to claim 1 wherein the impure alkyl methacrylate is obtained from the hydrogen iodide hydrate catalyzed oxidative dehydrogenation of an alkyl isobutyrate.

4. A process according to claim 2 wherein said alkyl is methyl.

5. A process according to claim 1 wherein step (c) is by distillation at atmospheric pressure.

6. A process according to claim 1 wherein step (e) is by distillation at reduced pressure.

7. A process according to claim 1 wherein the concentration of isobutyric acid in said distillation means is maintained at an amount of from about 20 to about 40 weight percent based on alkyl methacrylate.

8. A process according to claim 1 wherein said step (c) distillation is effected at atmospheric pressure and said step (e) distillation is effected under a reduced pressure of 50 to 200 mm. of mercury.

9. A process according to claim 1 wherein the isobutyric acid and other impurities are recycled to the alkyl methacrylate manufacturing process.

* * * * *

UNITED STATES PATENT OFFICE

CERTIFICATE OF CORRECTION

Patent No. 3,622,467           Dated November 23, 1971

Inventor(s) A. E. Blood, Max Statman, G. L. Phillips

It is certified that error appears in the above-identified patent and that said Letters Patent are hereby corrected as shown below:

Column 2, line 44, delete one "column";
  line 47, delete "2,719.171" and insert ---2,719,171---;

Column 3, line 9, delete "6.1" and insert ---6:1---;

Column 4, lines 56 and 57, delete "above the polymerization temperature of the alkyl methacrylate" and insert ---within the range at which the alkyl methacrylate would normally be expected to polymerize---.

Signed and sealed this 25th day of July 1972.

(SEAL)
Attest:

EDWARD M. FLETCHER, JR.          ROBERT GOTTSCHALK
Attesting Officer                Commissioner of Patents